United States Patent

Huang

Patent Number: 6,035,408
Date of Patent: Mar. 7, 2000

[54] PORTABLE COMPUTER WITH DUAL SWITCHABLE PROCESSORS FOR SELECTABLE POWER CONSUMPTION

[75] Inventor: Su Shion Huang, San Jose, Calif.

[73] Assignee: Magnex Corp., San Jose, Calif.

[21] Appl. No.: 09/003,284

[22] Filed: Jan. 6, 1998

[51] Int. Cl.[7] ......................................... G06F 1/00
[52] U.S. Cl. .................. 713/320; 713/300; 713/323; 713/324; 714/14; 714/22
[58] Field of Search ................ 714/14; 713/323, 713/300, 310, 320, 324; 455/574; 364/578

[56] References Cited

U.S. PATENT DOCUMENTS

| | | | |
|---|---|---|---|
| 5,054,052 | 10/1991 | Nonami ................................. | 455/574 |
| 5,230,074 | 7/1993 | Canova, Jr. et al. ..................... | 714/14 |
| 5,383,137 | 1/1995 | Burch ....................................... | 364/578 |
| 5,423,045 | 6/1995 | Kannan et al. ........................... | 713/323 |
| 5,669,003 | 9/1997 | Carmean et al. ........................ | 713/323 |
| 5,886,689 | 3/1999 | Chee et al. ............................... | 345/212 |

*Primary Examiner*—Meng-Ai T. An
*Assistant Examiner*—Nabil El-Hady

[57] ABSTRACT

A laptop computer has a first relatively powerful and fast data processor and a second relatively slower data processor. The first data processor has a higher power consumption factor than the second. A switch mechanism controls which of the two processors is operatively connected to the computer system components. When external power is available, the faster more powerful processor is used. When external power is unavailable and the computer must be operated from the internal power source, the second processor is used to drive the system components in order to provide a longer total operating duty cycle before the internal power source is exhausted.

3 Claims, 3 Drawing Sheets

PORTABLE COMPUTER WITH DUAL SWITCHABLE PROCESSORS FOR SELECTABLE POWER CONSUMPTION

BACKGROUND OF THE INVENTION

This invention relates to portable personal computers.

More particularly, this invention relates to a technique for improving the power consumption rate in portable personal computers.

Portable personal computers, particularly those of the type known as laptop computers, currently enjoy increasing popularity as an extremely useful business and personal aid across a wide cross-section of computer users. Continuing improvements in processing power, including faster processing speeds, increased memory capacity and improved I/O devices (such as faster internal modems) have led to a wider adoption of laptop computers for both business and personal use. The key ingredient to this success has been the continuing improvements in the processors incorporated into laptop computer systems: however, on average, as the processing power increases, the power consumption factor likewise increases. In addition, faster and more powerful processors typically generate so much heat that special cooling mechanisms must be incorporated into the computer—e.g. cooling fans, thermal cooling modules and the like. Since these necessary auxiliary devices themselves consume power, their presence raises the power consumption factor by an additional amount.

While the increase in power consumption due to faster, more powerful processors provides little or no disadvantage when the laptop computer is connected to an external power source (typically by means of an AC to DC converter or adapter), the higher power consumption factor reduces the useable duty cycle when the laptop computer is powered by an internal power source (typically a small rechargeable battery pack). A shortened useable duty cycle for a portable power source is a serious disadvantage in those cases in which the laptop computer user does not have access to an AC power source (e.g. while traveling on an airplane). One solution to this problem is to provide larger internal power sources or an extra battery pack in an accessory kit. However, this adds substantial weight to the laptop computer. This is a serious disadvantage since weight is one of the most important characteristics of a portable laptop computer and since users demand the lightest weight computer for convenience of traveling.

SUMMARY OF THE INVENTION

The invention comprises an improvement for a portable computer which provides extended useful duty cycle for the internal power source of a portable computer without sacrificing the advantage of faster processing speed and greater processing power.

A standard portable personal computer system according to the invention is provided with two data processors: a first relatively fast and powerful data processor having a first power consumption factor, and a second data processor having a second power consumption factor lower than the first power consumption factor. A switching arrangement enables the first processor to operate the portable computer system components when external power is available for the computer. When external power is not available and the computer must be operated by the internal power source, the second processor is connected to the computer system components and used to drive the system.

The switching mechanism used to control the operative interconnection between the first and second processors and the computer system components comprises a manually operable switch mounted in an accessible location on the portable computer housing. In an alternate embodiment, a sensing circuit senses the presence or absence of power on the external power input terminal of the portable computer and controls the power switching configuration between the first and second processors so that the more powerful processor is used when external power is available and the more power economical processor is used when only the internal power source is available.

The invention enables a single laptop computer to provide extended battery life and adequate processing capability when external power is unavailable; while also affording the higher processing and the advantages attendant therein when external power is available.

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
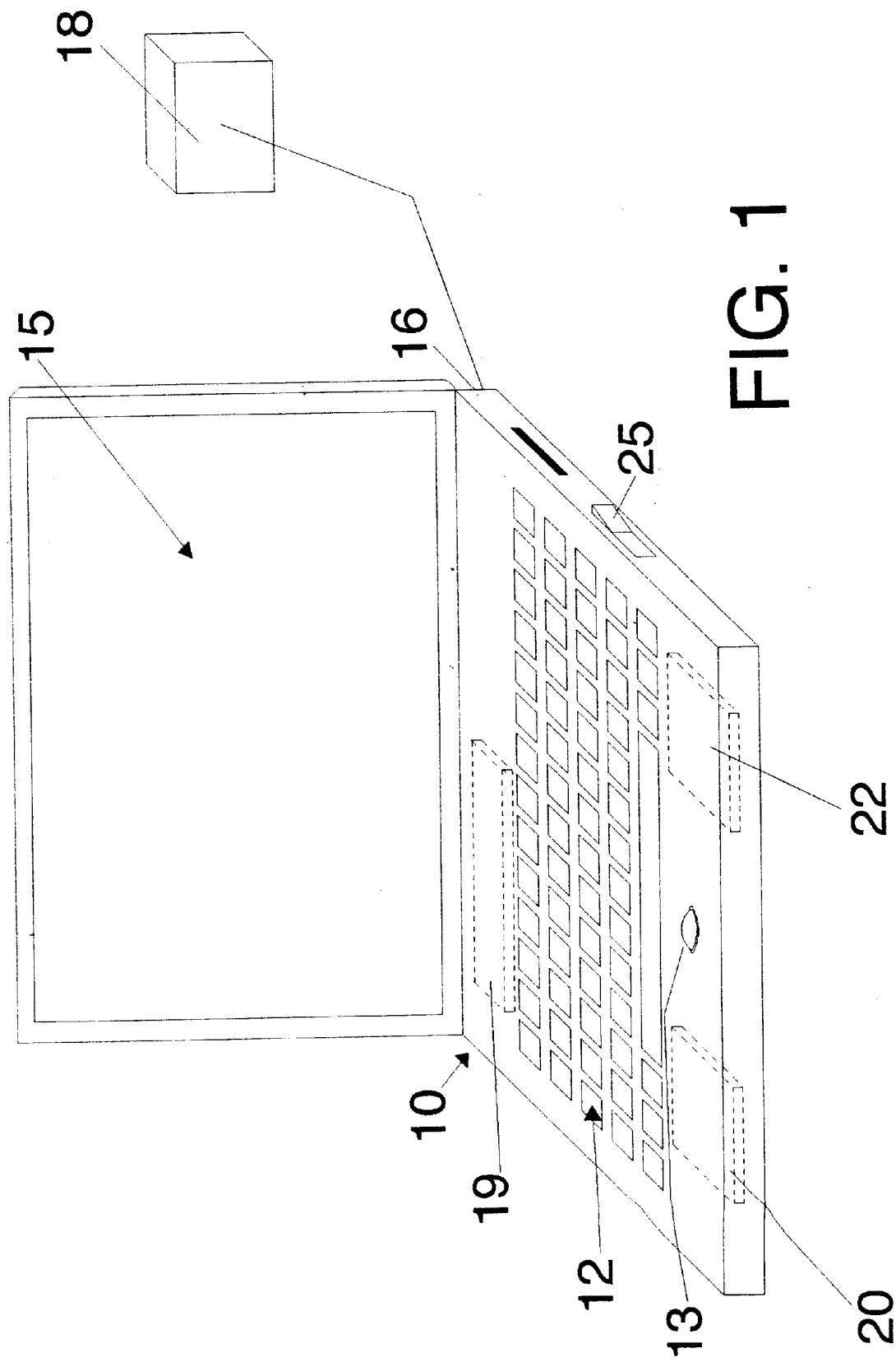
FIG. 1 is a perspective view of a laptop computer incorporating the invention.

Turning now to the drawings, FIG. 1 illustrates a portable computer incorporating the invention. As seen in this figure, a portable computer generally designated with reference numeral 10 and configured as a laptop computer contains a data entry keyboard and associated circuitry 12, a track ball 13 functioning as a mouse, a data display 15, an external power input 16 for enabling external power from an available AC source to be coupled to the working components of computer 10 by means of a standard adapter 18, and an internal power source 19 (usually a rechargeable battery pack). Since elements 12, 13, 15, 16, 18 and 19 are conventional, they will not be described in further detail in order to avoid prolixity.

Mounted within the housing of computer 10 is a first, relatively fast and more powerful processor 20. Also mounted within computer housing 10 is a second relatively slower and less powerful processor 22. Processor 20 provides greater processing speed and power but at a higher power consumption factor. Processor 22 provides less powerful and slower processing but at a lower power consumption factor. While the exact identity of processors 20 and 22 will vary depending on the current state of the art, in general processor 20 will be the most powerful processor available at any given time, while processor 22 will be a less powerful and most probably a previous generation processor. Considering the state of today's processor technology, power processor 20 may comprise one of the following commercially available processors: Pentium II 233 mHz, 266 mHz or 300 mHz; while processor 22 may comprise the following processor: a Pentium processor operated at a lower frequency, e.g. 166 mHz. These processors are commercially available from Intel Corporation. Other comparable selections from other families of processors (e.g. those available from Motorola, Inc. and AMD) will occur to those skilled in the art.

Figure 2:
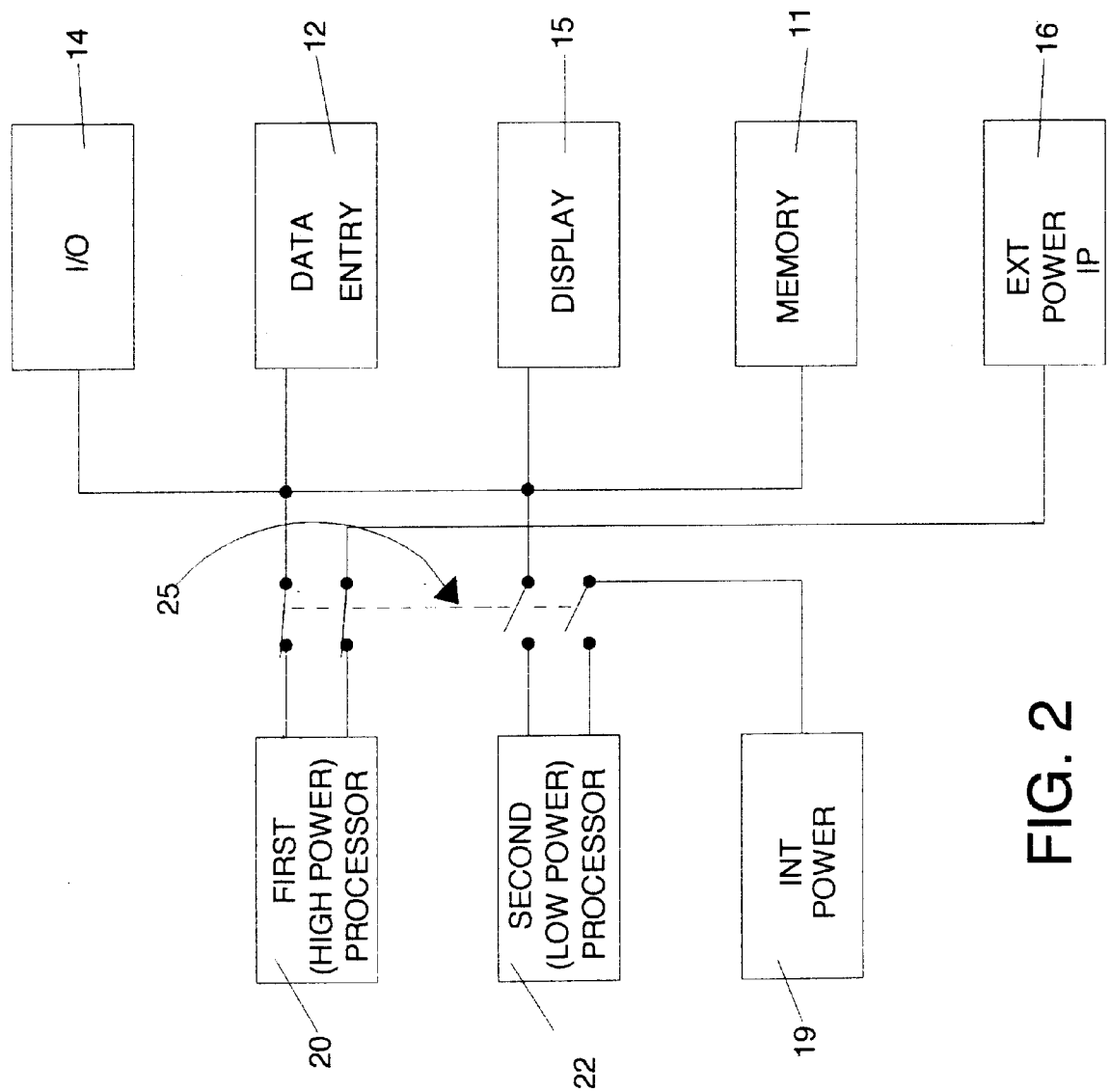
FIG. 2 is a block diagram illustrating a first embodiment of the invention.

Mounted on housing 10 in a convenient location is a manually operable switch 25. Switch 25 determines which of the two processors 20, 22 is used to operate the computer system components. When external power is available to power the computer system components, switch 25 will be placed in a setting in which the processor 20 is operatively connected to the various computer system components; when external power is not available, switch 25 can be set to the position in which processor 22 is used to control the computer system components. FIG. 2 illustrates in schematic form the manner in which this is done. As seen in this figure, the computer system includes the standard system components, such as memory 11, data entry circuitry 12, I/O devices 14 (e.g. a modem, removable hard disk, floppy disk drive, etc.) and display 15. Each of these system components may be driven either by processor 20 or processor 22. When switch 25 is in the external power position illustrated in FIG. 2, processor 20 is coupled via the upper portion of switch 25 to the external power input 16 and to the system components 11, 12, 14 and 15. When switch 25 is in the alternate position not illustrated in FIG. 2, second processor 22 is coupled to the system components and to internal power source 19.

Figure 3:
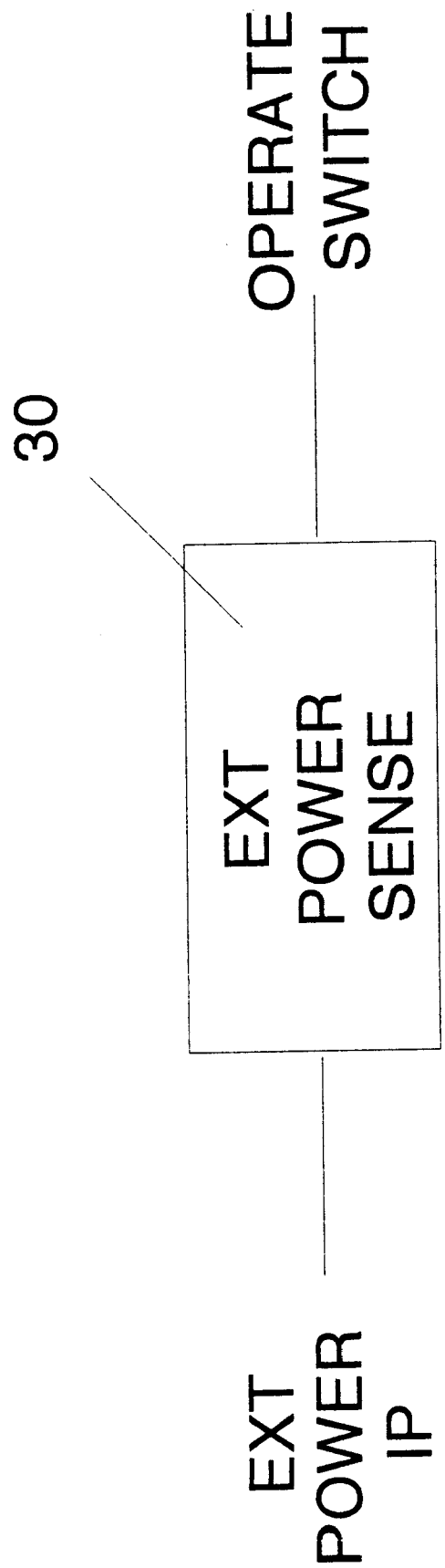
FIG. 3 is a detailed schematic view illustrating an alternate arrangement for the power switching mechanism.

FIG. 3 illustrates an alternate embodiment of the switching mechanism 25 in which an external power sense circuit 30 is coupled to the external power input 16 and used to operate switch 25. External power sense circuit 30 may be a voltage level sensor capable of generating an operate switch signal for controlling the state of switch 25 between the two control states (i.e., external power present—use processor 20; external power absent—use processor 22). In this embodiment, switch 25 can be modified by using an electromechanical or solid state relay switch having the appropriate response to external power sense circuit 30.

The magnitude of the increase in the internal battery power cycle in any given implementation of the invention will depend upon the actual power consumption of each of the two processors 20, 22, as well as the operating preferences of the computer user. By way of example, a type 486 processor operated at a frequency of 66 mHz has a power consumption factor of about 6 watts. In contrast, a Pentium II processor operated at 233 mHz has a power consumption factor of 33.6 watts; one operated at 266 mHz has a power consumption of 37 watts, and one operated at 300 mHz has a power consumption factor of 41.4 watts. Thus, by switching to the lower power processor 22 in the absence of an external power source, the duty cycle of the portable computer can be substantially extended. One study has indicated that a portable computer using a Pentium II processor operated at the higher frequency range can be powered by the internal battery for about one hour; while a Pentium II processor operated at 200 mHz can be powered for approximately four hours by the internal battery.

As will now be apparent, the invention affords the flexibility of providing the maximum desired processing power while also providing a longer internal power duty cycle with adequate processing power in the absence of an external power source. Moreover, this advantage is provided by components which add very little cost to the overall cost of the computer system. More particularly, the added components merely comprise the relatively inexpensive switch 25 and processor 22, the cost of which is typically nominal when compared to the current cost of a state of the art high power processor.

While the above provides a full and complete disclosure of the preferred embodiments of the invention, various modifications, alternate constructions and equivalents will occur to those skilled in the art. For example, switch 25 may be incorporated into the input jack typically associated with external power input 16 so as to connect processor 20 whenever a jack from adapter 18 is inserted into the external power input 16. Therefore, the above should not be construed as limiting the invention, which is defined by the appended claims.

What is claimed is:

1. In a portable computer having data entry means, information display means, a data processor having a first power consumption factor for processing data and supplying data processing results to the information display means, an internal power source and an external power input; the improvement comprising a second data processor having a second power consumption factor smaller than said first power consumption factor for processing data and supplving data processing results to the information display means, and switching means for operatively connecting said second data processor to said internal power source, said data entry means, and said information display means when power is absent from said external power input and for operatively connecting said first data processor to said external power input, said data entry means, and said information display means when power is present at said external power input so that said first data processor is rendered operational when power is present at said external power input and said second data processor is rendered operational when power is absent from said external power input.

2. The invention of claim 1 wherein said switching means comprises a manually operable switch.

3. The invention of claim 1 wherein said switching means includes means for sensing the presence or absence of power at said external power input, and means for controlling the operational configuration of said first and second data processors in response to said sensing means.

* * * * *